(12) United States Patent
Buechi et al.

(10) Patent No.: US 7,799,454 B2
(45) Date of Patent: Sep. 21, 2010

(54) METHOD AND DEVICE FOR STACKING FUEL CELLS

(75) Inventors: Felix Buechi, Langenthal (CH); Daniel Schmid, Winterthur (CH); Martin Ruge, Bettlach (CH)

(73) Assignee: Paul Scherrer Institut, Villigen (CH)

( * ) Notice: Subject to any disclaimer, the term of this patent is extended or adjusted under 35 U.S.C. 154(b) by 951 days.

(21) Appl. No.: 10/885,126

(22) Filed: Jul. 7, 2004

(65) Prior Publication Data

US 2004/0241524 A1 Dec. 2, 2004

Related U.S. Application Data

(63) Continuation of application No. PCT/CH03/00014, filed on Jan. 14, 2003.

(30) Foreign Application Priority Data

Jan. 23, 2002 (CH) .................................... 118/02
Jun. 30, 2002 (CH) .................................... 1131/02

(51) Int. Cl.
*H01M 8/02* (2006.01)
(52) U.S. Cl. ....................................................... 429/35
(58) Field of Classification Search .................... 429/35
See application file for complete search history.

(56) References Cited

U.S. PATENT DOCUMENTS 4,314,231 A * 2/1982 Walty ........................ 338/328
4,945,010 A * 7/1990 Kaufman et al. .............. 429/26
4,956,245 A * 9/1990 Shimizu et al. ............... 429/26
6,124,051 A * 9/2000 Johnson ....................... 429/26

FOREIGN PATENT DOCUMENTS

| DE | 20016734 U1 * | 1/2001 |
| DE | 20016734 U1 | 2/2001 |
| JP | 2001307748 A * | 11/2001 |

OTHER PUBLICATIONS

Derwent-Abstract—DE 20016734U1; Proton Motor Fuel Cell GmbH, D-82319 Starnberg (Germany).
Patent Abstract of Japan, JP 2001307748, published Nov. 2, 2001, to Fuji Electric Co.Ltd.
Patent Abstract of Japan, JP 59035368, published Feb. 27, 1984, to Sanyo Electric Co. Ltd.

* cited by examiner

*Primary Examiner*—Tracy Dove
(74) *Attorney, Agent, or Firm*—Laurence A. Greenberg; Werner H. Stemer; Ralph E. Locher

(57) ABSTRACT

A fuel cell stack is disclosed having a number of stacked fuel cells, each having in series an anode-facing end plate, an anode, an ion-exchanging layer, a cathode and a cathode-facing end plate. The stack includes at least one conductive and flexible intermediate layer between elements of the stack. The intermediate layer is deformable implemented in terms of its thickness. The intermediate layer abuts and interacts, in a fluid-tight manner, with the end plates. The intermediate layer is further disposed between at least one of the anode-facing end plate and the cathode-facing end plate of adjacent fuel cells, an end plate of a stack and a cooling plate attached to said end plate and an end plate of the stack and a cathode-facing end plate.

7 Claims, 4 Drawing Sheets

METHOD AND DEVICE FOR STACKING FUEL CELLS

CROSS REFERENCE TO RELATED APPLICATIONS

The present application is a continuation of international application PCT/CH03/00014, filed Jan. 14, 2003, which designated the United States, and further claims priority to Swiss patent application 118/02 and 1131/02, filed Jun. 30, 2002, all of which are herein incorporated by reference.

BACKGROUND OF THE INVENTION

The present invention relates to a fuel cell stack, a fuel cell, an intermediate layer for a fuel cell or fuel cell stack, and a method.

A fuel cell has a sandwich-like structure with an electrolyte disposed between end plates. Between the electrolyte and one end plate there is an anode, and between the electrolyte and the other end plate a cathode. Solid and liquid electrolytes are known; accordingly, the electrolyte can be accommodated in a supporting structure or may itself possess the required solidity to enable it to be built into the cell. The operating temperatures are likewise significantly different, varying from ambient to several hundred degrees C. or more.

A known practice is to combine individual fuel cells to form a fuel cell stack as a means of obtaining the required operating voltage by connecting a suitable number of individual cells in series.

In addition to the individual fuel cells, a fuel cell stack then contains, on each side of the stack, special end plates which complete the stack, and preceding each of said end plates a connection plate (e.g. gold-coated copper plate) with the connections enabling the stack to be connected to the leads of the supplied load.

The abovementioned elements are stacked until the fuel cell stack contains the required number of fuel cells and are then clamped together including the connection and end plates. This can be performed by tie rods which run through the entire stack and are bolted to the end plates.

Assembling a stack of this kind is an intricate process, as all the elements have to be individually placed on top of one another and held in the correct fit until they are bolted together.

In addition, e.g. the connection plates are expensive to manufacture.

Assembly can be simplified by using bipolar plates. A bipolar plate according to the prior art is produced e.g. by implementing the end plates of two adjacent fuel cells as a single piece, with the advantage that, when assembling a plurality of fuel cells to form a fuel cell stack, the number of elements to be assembled can be reduced. Cooling channels can additionally be disposed in the bipolar plates, resulting in considerably improved thermal management of the fuel cell stack.

Current flows in a bipolar plate during operation of a fuel cell stack, as said plate constitutes the electrical connection between the anode of one adjacent fuel cell and the cathode of the other adjacent fuel cell.

It is likewise possible to bond together adjacent end plates of the individual fuel cells to form a bipolar plate.

Instead of clamping, individual elements or all the elements of the fuel cell and of the entire fuel cell stack could also be bonded together, which yields an operational solution. This is likewise an intricate process:

Checking the parts to be bonded for damage such as scratches, etc., evenly applying the glue, drying, drawing off solvent vapor, bonding under pressure and temperature, cleaning off excess adhesive (blockage of gas supply and cooling channels, etc), checking that all the media such as air, hydrogen, water, etc. are properly separated from one another, etc.,—all the foregoing prevent quick and easy assembly of the elements to form a fuel cell stack.

A fuel cell stack may contain a large number of fuel cells: for example, a stack of fuel cells having a polymer membrane as an electrolyte, producing 7 kW and weighing approximately 20 kg possesses around 100 cells.

There also arises the question of testing a newly manufactured fuel cell stack and of repair and maintenance: individual defective cells must be able to be removed from the stack, repaired or replaced and reinserted. Although this is essentially not impossible in the case of a bonded stack, it makes little sense because of the time and effort involved. Even with a clamped stack, the time and effort is considerable: the clamp must be undone, which requires particular care in the handling of the cells which do not need to be replaced. These must not detached from one another and also in particular as a unit, so as not to disturb the original fit of the individual elements.

A disadvantage further arises when using bipolar plates: the selected cell can only be replaced along with the end plates of the adjacent cells. The adjacent cells therefore have to be dismantled; electrodes as well as electrolyte lose their original fit. The advantage for manufacturing the fuel cell stack becomes a disadvantage in the stack's later life.

It has therefore become a known practice to form packages of two end plates and seal them with a kind of O-ring seal, thereby creating a unit that is functionally identical to the bipolar plate. Precise machining of the abutting surfaces of the end plates is critical here, as the contact resistance must remain small (otherwise the fuel cell stack will lose efficiency) and the cooling channels must remain tight. The outline and sealing quality of the ring seal are likewise critical, as the gas supply channels must be sealed off from one another depending of the design of the fuel cell stack (one channel carries e.g. oxygen and the other hydrogen). The ring seal is expensive in itself (because it must be individually manufactured for particular end plates) and mounting it is difficult and therefore costly.

The abovementioned disadvantages also apply to the manufacture and assembly of the connection and end plates of the stack with the associated seals.

For the purpose of simplifying the description, such packages comprising two joined end plates and similar to bipolar plates,—although not implemented as a single piece—will hereinafter likewise be referred to as bipolar plates, as these packages have the same function in the fuel cell stack as the single-piece bipolar plates.

As a result either single-piece bipolar plates can be used, with the disadvantage that when a fuel cell is removed from the fuel cell stack, dismantling of adjacent cells is unavoidable. Alternatively, disassemblable i.e. multi-piece bipolar plates as described above can be used which, however, involve considerable effort and cost in terms of manufacture and joining together.

There has hitherto been no known design which can provide the proper functionality provided e.g. by the single-piece bipolar plate while at the same time simplifying assembly in terms of effort or handling or which will also allow the manufacturing, assembly and maintenance cost/complexity to be reduced for the ends of the fuel cell stack with their connection and end plates which must be kept fluid-tight.

SUMMARY OF THE INVENTION

Accordingly the object of the present invention is to overcome these disadvantages and provide an improved design.

The use of a conductive intermediate layer obviates the need for direct current-conducting contact between the end plates, which also allows the intermediate layer to be implemented as a planar element over the dimensions of the end plates, with the consequence that there is provided an easily manipulable element for the assembly of a fuel cell stack or the replacement of fuel cells in a fuel cell stack.

A deformable intermediate layer further permits flexible abutting on the thereto facing surfaces of the adjacent end plates, with the consequence that less exacting requirements can be placed on the manufacturing tolerances of the end plates. This applies not only to the local surface quality but also to the implementation of the surface over its entire dimension, should the latter not be level but e.g. convex or e.g. inclined in form. A deformable intermediate layer can compensate for such machining defects, so that machining itself can be performed more easily and therefore considerably more cheaply.

In order to assemble a fuel cell stack, the individual elements are first brought together and then clamped in position. When an intermediate layer according to the invention is used, all the end plates or bipolar plates can align themselves in the stack during clamping as the intermediate layer deforms. This eliminates any overstressing e.g. of the electrolyte or its supporting structure (PEM membrane) in the completely assembled stack.

In a particular embodiment, assembly complexity can be significantly reduced still further if the intermediate layer is fixed to one end plate e.g. by bonding. Instead of 3 elements to be assembled, the bipolar plate according to the invention then has 2.

By bonding both end plates to the intermediate layer, it is also basically possible to manufacture a bipolar plate according to the present invention as a unit and incorporate it in the fuel cell stack during assembly, which reduces assembly complexity, although this must then, as described above, be weighed against the disadvantage with regard to the then unavoidable disassembly of the adjacent fuel cells when replacing a cell.

As the end plates can have a thickness in the millimeter range and length and width dimensions of e.g. 10 cm or more, the cooling channels must be implemented as an open labyrinth on the intermediate layer side, so that the labyrinth is covered by the intermediate layer and the cooling channels are sealed.

The intermediate layer according to the invention is advantageously impermeable to the ambient air and to the media used, such as hydrogen or oxygen and a coolant. A compact stack design can then be implemented.

Flexible graphite possesses the abovementioned properties. However, the invention is not limited to this material but encompasses all materials that are conductive and can be used as an intermediate layer.

If the intermediate layer is provided with a current-conducting structure, there is no need to use a hitherto indispensable plate for connecting the electrical leads to the fuel cell stack. As the copper plates hitherto necessary had to be provided with corrosion protection (e.g. gold coating), not only is assembly simplified by the present invention, but the manufacturing costs are also relevantly reduced. Further embodiments of the present invention are set forth in the dependent claims.

BRIEF DESCRIPTION OF THE SEVERAL VIEWS OF THE DRAWINGS

The invention will now be explained in greater detail with reference to the accompanying drawings in which.

DETAILED DESCRIPTION OF THE INVENTION

Figure 1:
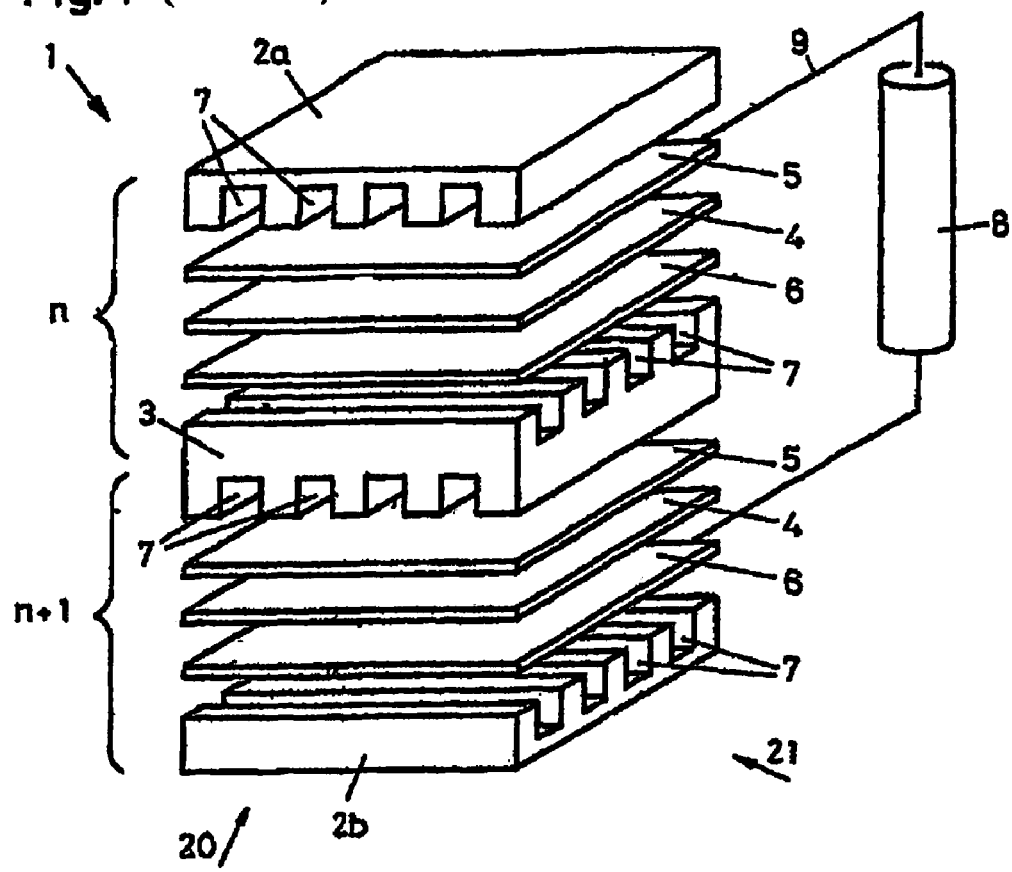
FIG. 1 schematically illustrates the construction of fuel cells having regard to the individual fuel cells according to the prior art, FIG. 2 schematically illustrates the construction of a stack of fuel cells with the elements necessary at the ends of the stack according to the prior art.

FIG. 1 illustrates schematically and by way of example a stack 1 of fuel cells comprising the two PEM fuel cells n and n+1. Such an arrangement will be familiar to an average person skilled in the art. Although for simplicity's sake the stack 1 is shown with only two fuel cells n and n+1, it can contain any number of cells. For a common application e.g. a hundred cells will be provided. Each fuel cell n and n+1 possesses end plates 2a and 2b, the adjacent end plates of the cells n and n+1 being combined to form the bipolar plate 3. Between the end plates 2a, 2b and 3 there is located a polymer membrane 4, between the membrane 4 and the end plates 2a, 2b 3 there is an anode 5 and a cathode 6 respectively. Channels 7 are used to supply gas, $H_2$ on the anode side, $O_2$ or ambient air on the cathode side (other possible reactants will also be known to the average person skilled in the art). The channels are implemented in such a way that the gases can be supplied as evenly as possible over the entire membrane surface. Gas supply and removal channels 10 running along the lateral faces 20, 21 of the stack 1 (FIG. 3) and which serve the channels 7 are not shown for the sake of representational clarity. Likewise not shown are the cooling channels in the bipolar plate 3.

The layout of the channels 10 or of the cooling channels will be familiar to the average person skilled in the art. The channels 10 basically run along the entire length of the stack 1 and end blind at one end of the stack 1, whereas at the other end of the stack 1 they pass through its end plate so that they can be connected to an external supply. The stack 1 is supplied with coolant in a similar manner.

Figure 2:
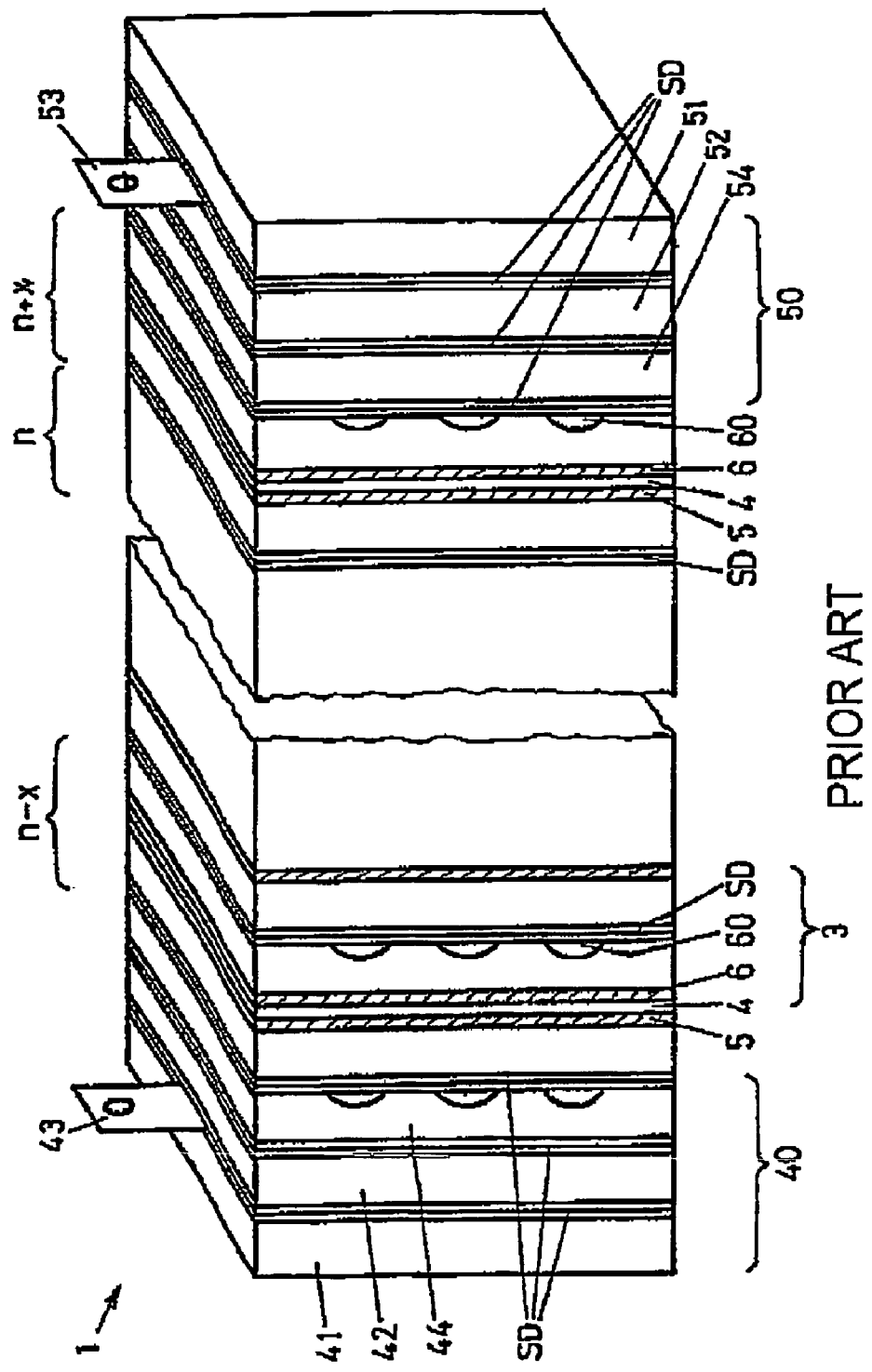

An electrical load 8 is connected to an anode 5 and a cathode 6 via a conductor 9. The Figure schematically illustrates the direct connection of the conductor 9 to the electrodes. FIG. 2 shows the correct layout of a stack 1 with a special connection plate 42,52. FIG. 1 further illustrates that, when a single-piece bipolar plate 3 is used, replacing a cell n involves dismantling the cells n+1 and n−1, with the disadvantage that the electrodes 5,6 and the membrane 4 lose their original fit.

FIG. 2 shows a conventional stack 1 having individual fuel cells n−x, n and n+x. The ends 40,50 of the stack 1 have end plates 41,51 (the end plate 41 blocks off the channels 10, the end plate 51 possesses openings (not shown here) for connecting the channels 10 to the external supply). Also shown are connection plates 42,52 with connection lugs 43,53 for connecting to a conductor 9. In the end 40 there is further provided a cooling plate 44 as a patterned graphite plate, and in the end 50 an unpatterned plate 54 (see description for FIG. 6). The plates 44,54 prevent media cross flow, the plate 44 as mentioned being additionally provided with cooling channels 60.

The fuel cells n−x, n and n+x have the structure depicted in FIG. 1 but are here provided with cooling channels 60 running crosswise through the bipolar plates 3.

Between all the abovementioned elements (end plates 41,51; connection plates 42,52; cooling plate 44 and plate 54 and in the bipolar plates 3) there is provided a ring seal SD which prevents unwanted contact of the various media circulating in the stack.

Figure 3:
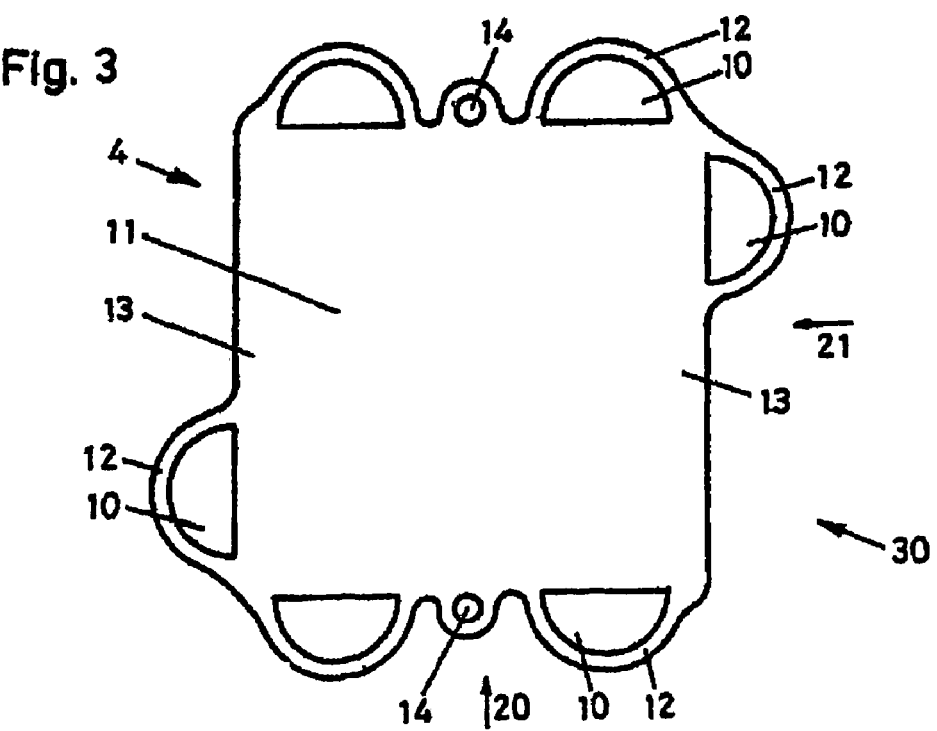
FIG. 3 shows a view of an intermediate layer according to the invention, FIG. 4 schematically illustrates the construction of a bipolar plate according to the present invention, FIG. 5 schematically illustrates the construction of an intermediate layer according to the invention which can be connected to an external conductor, and FIG. 6 schematically illustrates the construction of a stack of fuel cells according to the present invention.

FIG. 3 is a schematic view of an intermediate layer 30 according to the invention having a body 11 as well as fluid-tight sealing edge sections 12 for gas supply or removal channels 10 running along the outer sides 20, 21 of the stack 1 and feeding the channels 7 running crosswise through the stack 1 (FIG. 1).

The intermediate layer 30 further has fluid-tight sealing edge sections 13 for the edges of the end or bipolar plates 2a, 2b and 3, thereby preventing unwanted contact of the various media. Also shown are cutouts 14 for tie elements which hold the stack 1 together mechanically. The geometry of the intermediate layer 30 therefore corresponds to the geometry of the adjacent elements of the stack 1, whether it be end plates 2a and 2b or bipolar plates 3 of the individual fuel cells or the plates for the power connection or the end plates 41,51 of the stack 1.

The construction of the stack 1 as shown in FIGS. 1 and 2 will, as mentioned, be familiar to the average person skilled in the art The geometry of the intermediate layer 30 is not limited to the form depicted in FIG. 2; the plates 2a, 2b and 3 can be provided with any outline, whether it be in respect of the body 11 or of the channels 10 or the cutouts 14. It is also conceivable for adjacent fuel cells 1a, 1b to be equipped with an intermediate layer 30 implemented as a single piece, i.e. for adjacently disposed stacks 1 which are supplied e.g. by a common gas supply channel 10. The geometry of the intermediate layer in turn corresponds to the adjacent elements of the stack 1.

The intermediate layer 30 is preferably made of flexible graphite, such as that available in Germany e.g. from the company SGL Carbon AG under the designation "Sigraflex".

The intermediate layer 30 can be implemented with a thickness of 1 mm or 0.5 mm, in the form of a foil. The thickness is preferably less than 1 mm, i.e. between 0.5 and 0.3 mm.

Figure 4:
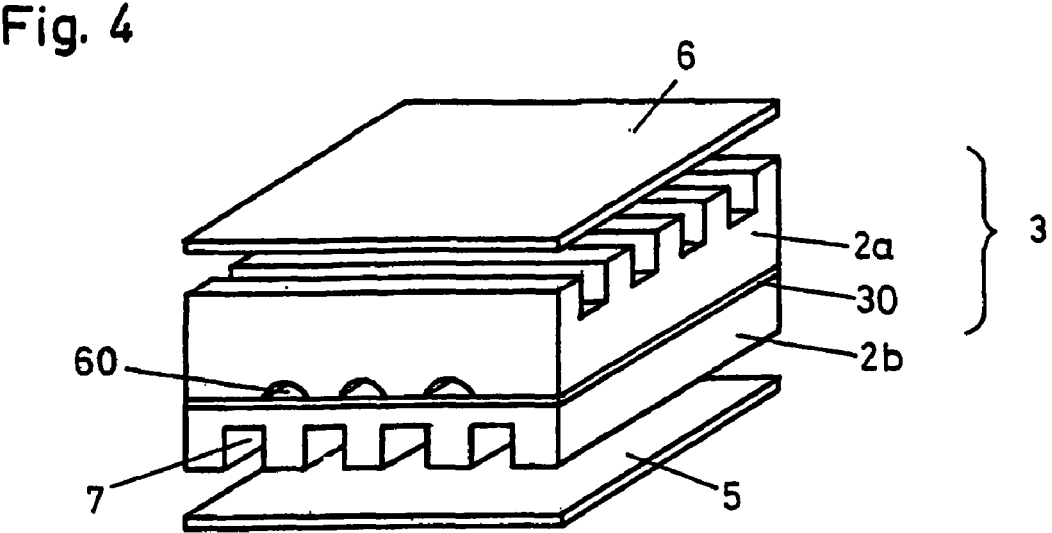

FIG. 4 shows a bipolar plate 3 in an exploded view of FIG. 1 with the adjacent anode 5 or cathode 6. The end plate 2a belongs to the fuel cell n and the end plate 2b to the fuel cell n+1 (FIG. 1). Instead of a ring seal, there is a flexible intermediate layer 30 according to the present invention between the end plates 2a and 2b. In the end plate 2a are disposed cooling channels 60 which are sealed off by the intermediate layer 30. This layer separates the fuel cells n and n+1 from one another; it is disposed between the end plates 2a, 2b of adjacent fuel cells n, n+1.

Figure 5:
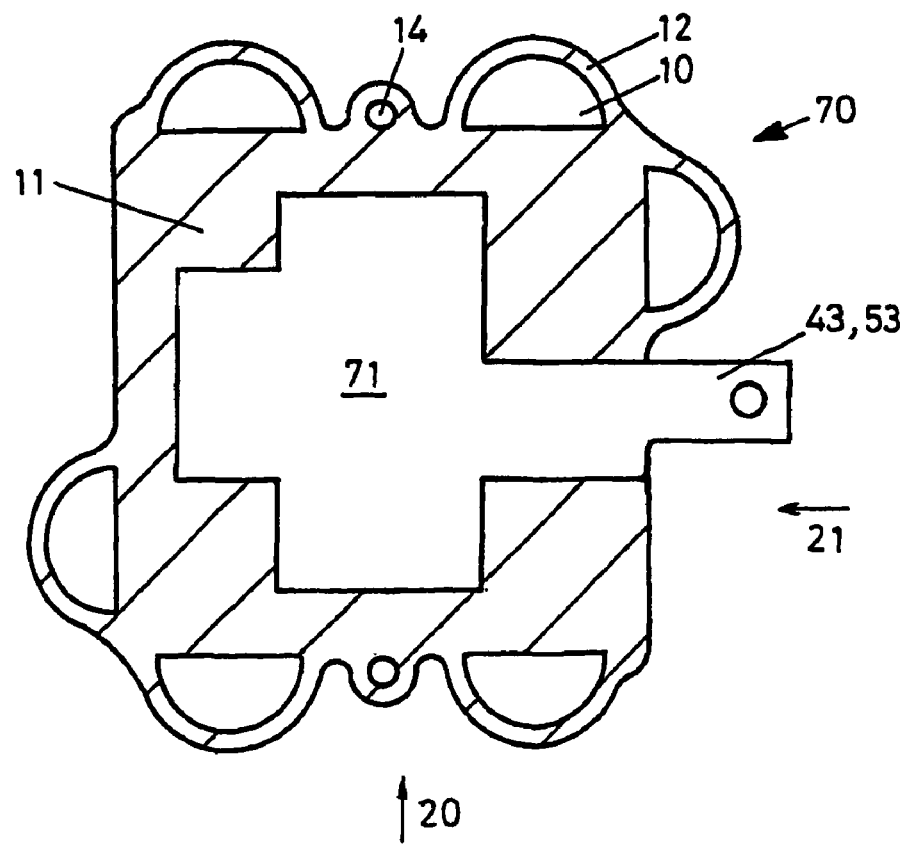

FIG. 5 shows a cross-section of an intermediate layer 70 which is a modified version of the intermediate layer 30. A copper sheet (good conductor) implemented as a lead section 71 and which feeds out the current produced by the stack 1 to the conductor 9 is inserted for the connection lugs 43,53. The copper sheet 71 possesses an outline such that a form fit is produced in the intermediate layer 70 and has as large an area as possible for low contact resistance between the sheet 71 and the intermediate layer 70. The intermediate layer 70 shown in the Figure is preferably three-layered: two outer layers of flexible graphite possess the configuration according to the outline of FIG. 5; one middle layer of flexible graphite possesses the outline of the hatched area shown in the Figure, so that the copper sheet 71 can be inserted in the vacant space and is covered by the outer layers.

In another exemplary embodiment, a conductor grid can be incorporated in the intermediate layer 70 as the lead section 71 and connected to the connection lug 43,53. The conductor grid can also be inserted between two intermediate layers 70; the deformability of the flexible graphite or other material having the same properties produces a secure grid fit and faultless current flow. The more tightly meshed the grid, the lower the contact resistance.

It is likewise possible to implement the conductor 9 as a stranded cable and to insert the strands, as described above, between two intermediate layers 70 or incorporate them in an intermediate layer 70. The discharging of current from the stack 1 using an intermediate layer 70 can if necessary be modified by the average person skilled in the art, but without departing from the scope of the invention.

A special gold-coated connection plate is eliminated.

Figure 6:
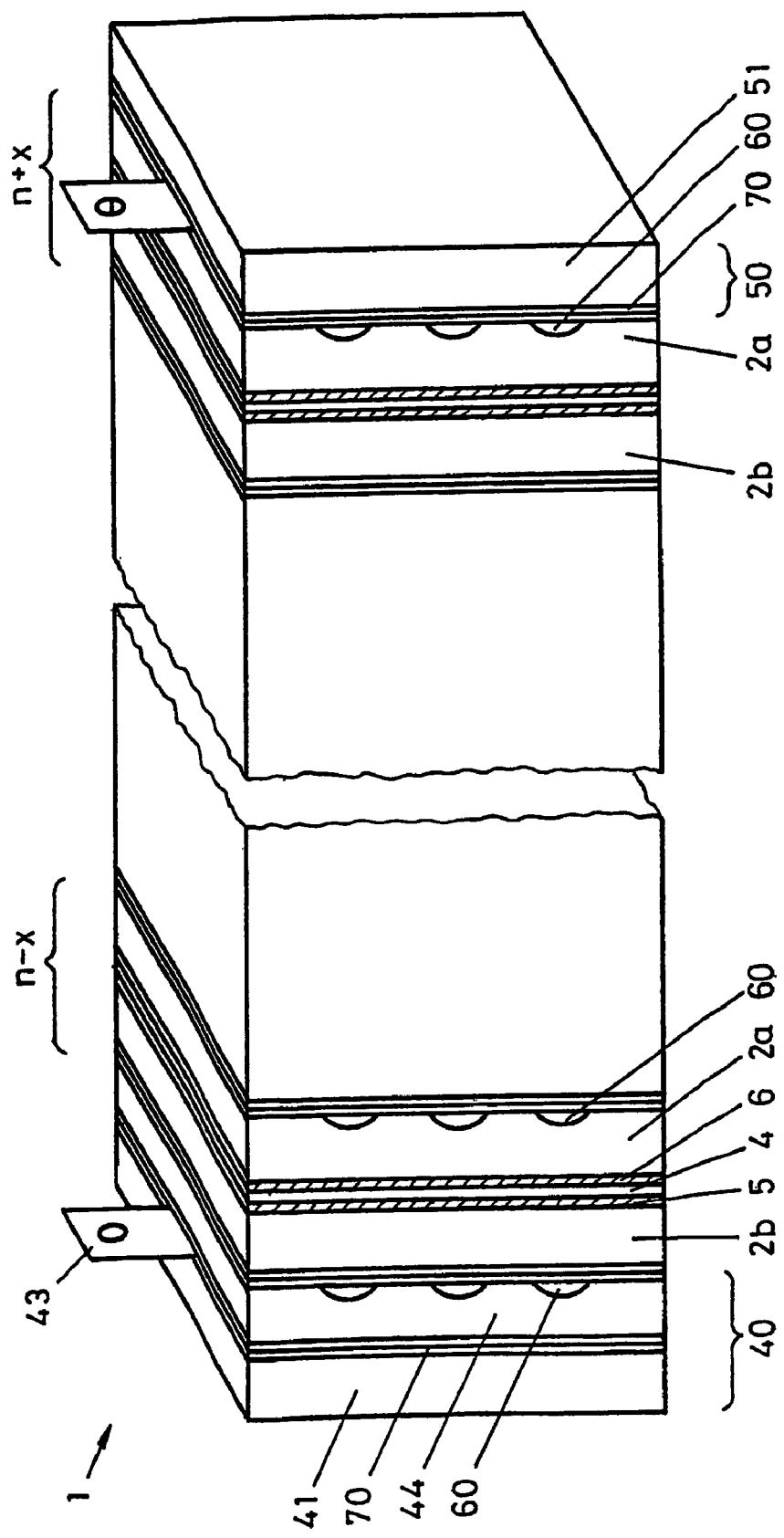

FIG. 6 shows a stack 1 of fuel cells n−x and n+x constructed according to the invention.

The end 40 of the stack 1 is formed by the end plate 41 and an intermediate layer 70 with a structure (not shown in the Figure) of lead sections 71 for the connection lug 43. A cooling plate 44 connects to the intermediate layer 70 and is implemented as a patterned graphite plate, the pattern consisting of channels 60 in which coolant flows. This is again followed by an intermediate layer 30 and then the fuel cell n−x of the stack 1. The fuel cell n−x abuts with its end plate 2b the intermediate layer 30 and contains no cooling channels (FIG. 4), so that the cooling plate 44 must be provided in the end 40. The intermediate layer 30 between the plate 44 and the cell n−x terminates the channels 10 which end blind here and seals said channels (as well as the cooling channels 60).

The end 50 of the stack 1 is formed by the end plate 51 and the intermediate layer 70 which is of identical construction to the intermediate layer 70 in the end 40 of the stack 1. This is followed by the fuel cell n+x; as the latter has an end plate 2a with cooling channels 60, there is no cooling plate like the cooling plate 44 in the end 40.

This material of the intermediate layers 30 and the intermediate layers 70 flexibly adapts to the surface contour of the plates 2a,b and 3 and permits current transfer across the entire relevant contact area with minimal transfer resistance. This flexible adaptation also means that the machining tolerances for producing the plates 2a and 2b as well as the plates 41, 51 and 44 can be relaxed, which reduces the processing costs themselves and reduces wastage in terms of defectively produced plates, thereby saving costs.

If e.g. the contact area to the intermediate layer 30 of a plate 2a,2b,41,51 or 44 is not aligned exactly parallel to the opposing surface in contact with the anode or cathode (e.g. wedge shape of one of the plates), this will cause the adjacent plate to be tilted. This tilt results in tensions in the stack 1, e.g. an impermissible local stressing of the membrane 4, which reduces the performance of the fuel cell affected and therefore of the stack 1 as a whole. This risk is eliminated by the deformable intermediate layer 30,70, as the compensation of the mutual positions of the plates 2a,2b,41,51 can take place via the deformation of the layer 30,70.

The passage of current through the bipolar plate 3 depends on the ohmic resistance of the intermediate layer 30 itself and on the contact resistance between the intermediate layer 30 and the adjacent end plates 2a, 2b. Test measurements have shown that the contact resistance from end plate 2a to end plate 2b—as is known e.g. when using a ring seal according to the prior art—is the same size as the sum of the resistances (contact and ohmic resistance) when using an intermediate layer 30 made of flexible graphite having a thickness of 0.5 mm in a bipolar plate 3 according to the invention under the pressure obtaining when a fuel cell stack is clamped in the normal manner.

This means that using the intermediate layer 30 according to the invention and having a correctly selected thickness provides a relevant advantage in current transfer through the bipolar plate, an advantage which is independent of the other advantages such as cheaper manufacture of the end plates, easier assembly, etc.

We claim:

1. A fuel cell stack comprising
   a first end plate,
   a second end plate,
   a number of conductive and flexible intermediate layers, and
   a number of fuel cells between the first end plate and the second end plate, wherein
      each fuel cell comprises in series an anode-facing end plate, an anode, an ion-exchanging layer, a cathode and a cathode-facing end plate to constitute an assembled and operational fuel cell,
      each intermediate layer is fluid-tight and comprises sealing edge sections for fluid channels,
      adjacent fuel cells are separated by one of the intermediate layers so that the intermediate layer is disposed between an anode-facing end plate and a cathode-facing end plate,
      one of the intermediate layers is disposed between the first end plate and a cooling plate coupled to the first end plate,
      one of the intermediate layers is disposed between the second end plate and a cathode-facing end plate, and
      one of the intermediate layers is disposed between the cooling plate and an anode-facing end plate.

2. The fuel cell stack according to claim 1, wherein the intermediate layer disposed between the anode-facing end plate and the cathode-facing end plate is placed over at least one of the anode-facing and cathode-facing end plates of individual fuel cells.

3. The fuel cell stack according to claim 1, wherein the intermediate layers are foils.

4. The fuel cell stack according to claim 1, wherein the intermediate layers include flexible graphite.

5. The fuel cell stack according to claim 1, wherein the intermediate layer disposed between the first end plate and the cooling plate, and the intermediate layer disposed between the second end plate and a cathode-facing end plate, comprise connection means facilitating connection to a conductor for collecting current produced by the fuel cell stack.

6. The fuel cell stack according to claim 5, wherein the intermediate layers adjacent to the first and second end plates comprise lead sections recessed therein and a conductor is connected to the intermediate layer via the lead sections.

7. The fuel cell stack according to claim 6, wherein the conductor is planar and form-fitted to the intermediate layer.

* * * * *